United States Patent [19]

Halliburton, Jr.

[11] Patent Number: 5,025,139

[45] Date of Patent: Jun. 18, 1991

[54] REDEEMABLE COUPON DISBURSEMENT CONTROL AND REPORTING SYSTEM

[76] Inventor: W. Ken Halliburton, Jr., 1618 Haynes Dr., Murfreesboro, Tenn. 37130

[21] Appl. No.: 130,088

[22] Filed: Dec. 8, 1987

[51] Int. Cl.[5] .......... G06F 15/30

[52] U.S. Cl. .......... 235/379; 235/385; 235/487

[58] Field of Search .......... 235/375, 379, 487, 385; 271/9, 10, 12, 110

[56] References Cited

U.S. PATENT DOCUMENTS

| | | | |
|---|---|---|---|
| 4,593,183 | 6/1986 | Fukatsu | 235/379 |
| 4,717,043 | 1/1988 | Groover | 271/110 |
| 4,723,212 | 2/1988 | Mindrum | 235/487 |

*Primary Examiner*—A. D. Pellinen
*Assistant Examiner*—Leon K. Fuller

[57] ABSTRACT

A redeemable coupon disbursement control and reporting system especially for modified and improved automated teller machines including either a bar code scanner attachment used with preprinted continuous roll or single sheet automated teller machine receipt paper or a printer responsive to signals from the user of the automated teller machine. In either form, first recording means are communicably attached to the disbursing or printing means and remote optical scanning means are employed at the point of coupon redemption, such scanning means being attached to either such first or a second recording means reconcilable with information recorded on such first recording means.

27 Claims, 4 Drawing Sheets

REDEEMABLE COUPON DISBURSEMENT CONTROL AND REPORTING SYSTEM

BACKGROUND OF THE INVENTION

The present invention is a redeemable coupon disbursement control and reporting network especially for use with modified and improved automated teller machines such as those currently used in the banking industry. At the present time, it has been estimated that over four billion transactions each year take place between banking customers and their banks through the use of automated teller machines. It has also been estimated that an even larger number of redeemable coupons are printed each year of which only a fraction are actually redeemed, and it is not possible in existing systems to control the disbursement and redemption of such printed coupons in an inexpensive and flexible manner.

Automated teller machines vary widely in specific design but common elements of all varieties in current use include the use of continuous roll receipt paper which is conveyed through the automated teller machine. The use of single sheet receipt paper is possible but is not believed to be a current practice. The automated teller machine receipt is printed individually for each transaction and is then cut and issued to the customer for his record. The paper is loaded into the automated teller machine at one end of the paper path into or onto a paper holder and then is fed through the machine to an external opening where the customer receives it. The transaction is summarized and printed onto the receipt, and information concerning the transaction is relayed to a recording device, generally a computer. The length of the receipt is often determined by signals sent to the conveyer by a diode which reads solid marks preprinted on the continuous roll of receipt paper at given intervals.

Automated teller machines also have means for communicating with the customer. Generally, the automated teller machine has a visual display device for providing instructions and information to the customer, and the automated teller machine has a manually-operated keyboard, panel or set of switches by which the customer supplies information to the bank regarding each transaction.

Advertisers frequently seek to target customer groups such as those conducting banking business in a given geographical area. Because banks are generally unwilling to provide customer lists to prospective advertisers and because banks are often unable to determine which branches their customers most frequently use, such advertisers must seek other means of reaching such groups effectively and efficiently. Historically, coupon promotion success has been capable of being measured in general terms only, by comparing gross sales before, during and after the promotion. A comparison of the number of coupons actually distributed to the number of coupons actually used is generally inaccurate because of the inability to track printed coupons which for one reason or another are discarded prior to distribution to a customer. In addition, it is difficult to control disbursement, and it is not unusual to find coupons being accumulated for multiple use by the same customer.

In addition, banks are finding costs continuing to increase but have generally not developed any means for effectively using the reverse side cf automated teller machine receipts for generating income. Instead, banks charge users of their automated teller machines a fee for each transaction. Many automated teller machines are capable of handling the transactions of customers of more than one banking institution through a networking arrangement, and the fees charged per transaction are generally higher for users who are not customers of the bank owning the particular automated teller machine. The fees for both bank customers and nonbank customers, though generally small, are usually substantially higher than the fee charged for writing a check, and some customers avoid using automated teller machines to avoid the fee, instead, writing checks or otherwise handling their banking needs. Because the overhead associated with a bank's automated teller machine fluctuates only slightly with greatly increased volume, increased volume can significantly increase profitability (or decrease losses) from the automated teller machine and therefore banks seek to increase the use of their automated teller machines. The fees charged for use of automated teller machines are generally in amounts similar to the amounts frequently found in redeemable coupon promotions conducted by fast food restaurants and other vendors.

It is believed that the most frequently occurring transaction at automated teller machines is that of cash withdrawal from the customer's account. Thus, customers of automated teller machines are likely to have cash in hand at the time of receipt of the automated teller machine receipts. Further, automated teller machines are frequently used after regular banking hours but during hours in which fast food and other vendors remain open, and automated teller machines are generally designed to limit the number of transactions which may be conducted by a given customer within a given time period.

Finally, it is difficult to devise inexpensive and effective systems for distributing single coupons to individual customers. Printed materials that are widely distributed as through mailings or publication of advertising in newspapers and magazines are subject to accumulation in the hands of a few customers for multiple use, requiring the vendor to honor coupons, usually done at a loss for promotional purposes, without the intended widespread goodwill and diversity of customers.

SUMMARY OF INVENTION

It is an object of the present invention to provide an inexpensive and flexible redeemable coupon disbursement control and reporting system especially for use with automated teller machines.

It is a further object of the present invention to provide a modification to an automated teller machine by adding a bar code scanner along the paper path of such automated teller machine for the purpose of reading preprinted bar codes on the reverse of a continuous role of automated teller machine receipt paper.

It is a further object of the present invention to replace the single-function diodes used to control receipt paper length with a multi-function bar code scanner having the capability of both signaling proper paper length and relaying additional information to a recording device.

It is a further object of the present invention to provide a modification to an automated teller machine by adding a printer capable of printing coupon information on the back of an automated teller machine receipt and which is responsive to selections made by the user of the automated teller machine.

It is a further object of the present invention to provide a modification to an automated teller machine by adding a wand bar code scanner at a remote location capable of reading bar code information printed on automated teller machine receipt paper.

It is a further object of the present invention to provide a modification to an automated teller machine by making receipts issued therefrom more valuable and less subject to being disposed of indiscriminately, thus reducing littering near the automated teller machine.

It is a further object of the present invention to provide a modification to an automated teller machine for the purpose of reducing the net cost to the user.

It is a further object of the present invention to place redeemable coupons in the hands of prospective customers who are likely to have cash in hand.

It is a further object of the present invention to provide a system for controlling the number of coupons distributed to each individual customer.

It is a further object of the present invention to provide means for accurately recording information about the automated teller machine redeemable coupon receipts which are actually redeemed at remote locations.

The foregoing objectives and still other objectives and advantages of the present invention will become apparent upon reading the following specification describing one preferred embodiment of the invention and also by reading the claims and referring to the following drawings in which the numbered parts of the embodiment described in the specification are shown by like numbered parts in the drawings.

DESCRIPTION OF PREFERRED EMBODIMENTS

The following descriptions set forth preferred embodiments of the present invention. It will be understood that there are other embodiments of the present invention, and the scope of the present invention is not limited by the following description of preferred embodiments.

Figure 1:
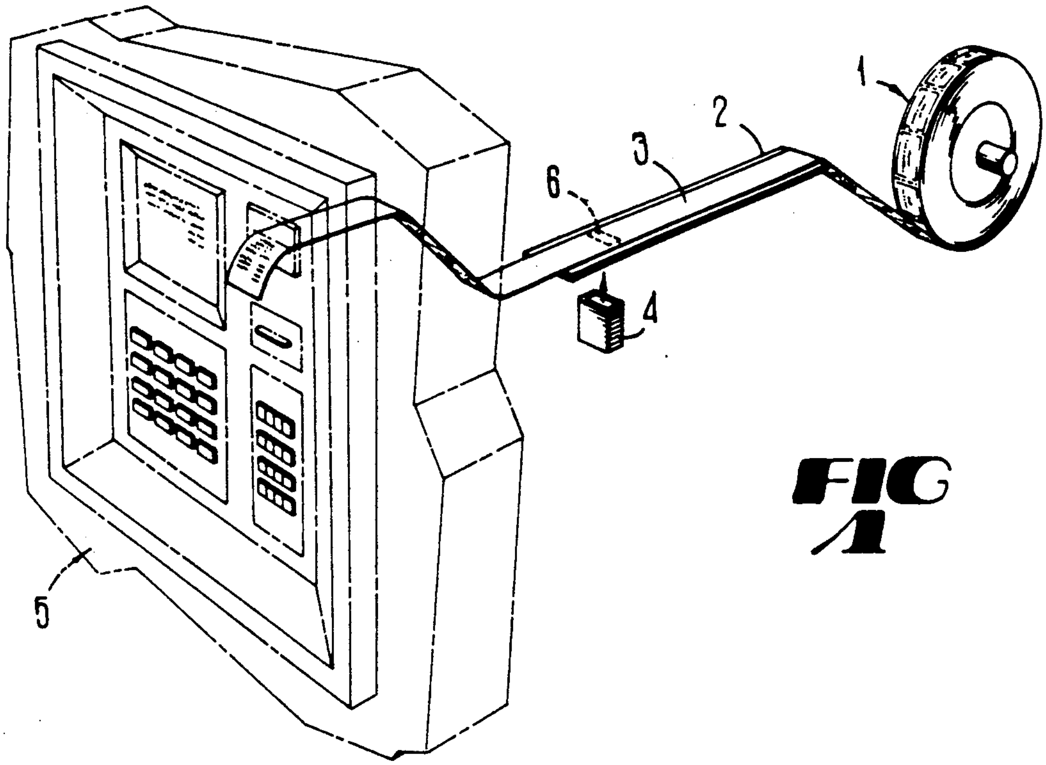
FIG. 1 is a perspective view of a first preferred embodiment of the present invention.
Figure 2:
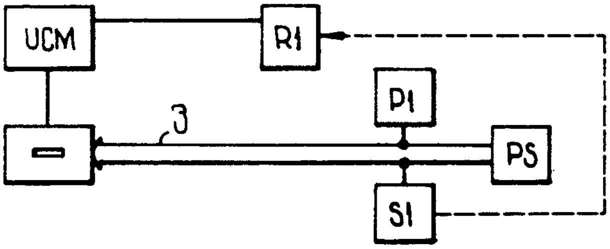
FIG. 2 is a schematic diagram of the first preferred embodiment of the present invention.

Referring to FIGS. 1 and 2, one preferred embodiment of the improved automated teller machine has a bar code scanner 4 positioned below a metal paper conveyer 2 having a hole 6 to permit the bar code scanner 4 to be directed toward, and focused on, the back of the continuous roll of automated teller machine receipt paper 1. On one side, the continuous roll of automated teller machine receipt paper 1 has been preprinted with advertising materials such as redeemable coupons together with a bar code symbol encoded with information describing such advertising material and also describing the location at which the receipt paper is being used. The other side of the continuous roll of automated teller machine receipt paper 1 is blank so that a customer's banking transaction may be recorded by a printer 7 located inside the automated teller machine 5. In order to avoid redemption of preprinted coupons which have not been properly disbursed through the control and reporting system, language is added to the coupon stating that a valid banking transaction must appear on the reverse to validate the coupon.

Figure 5:
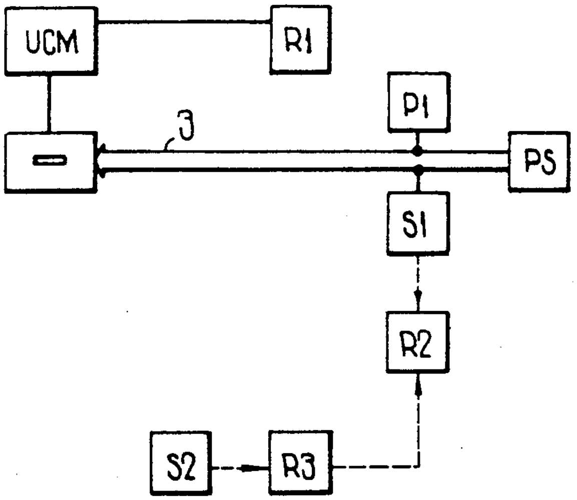
FIG. 5 is a schematic diagram of a fourth preferred embodiment of the present invention.
Figure 6:
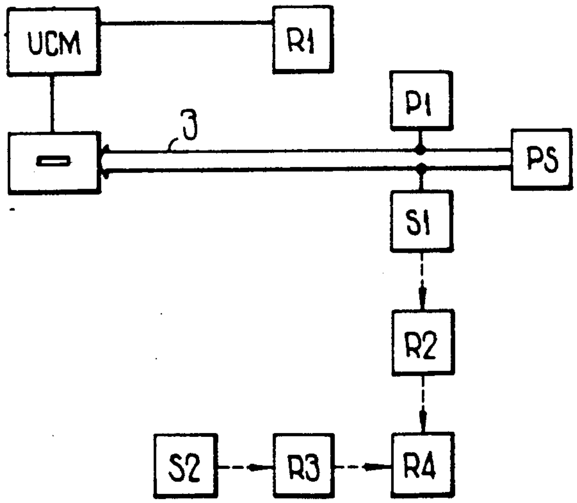
FIG. 6 is a schematic diagram of a fifth preferred embodiment of the present invention.

As seen in FIGS. 2, 3, 4, and 7, the bar code scanner 4 can be communicably attached by an information pathway 8 to a recording means 9, such as a computer located inside the automated teller machine 5, and can send the encoded information from each bar code to such recorder 9. Alternatively, as seen in FIGS. 5 and 6, the bar code scanner 4 can be connected to an independent recording device 11 by means of an information pathway 10. As shown in FIG. 1, the bar code scanner 4 may also be connected to the conveyer 2 to control the length of the individual receipt to be cut from the continuous roll of automated teller machine receipt paper 3 by cutting means. The conveyer may be started by the user of the automated teller machine at the automated teller machine face 5 at the conclusion of the transaction and then may be stopped by a signal from the bar code scanner 4.

Using the improved automated teller machine, advertisers will be able to target banking customers in a given locale and will have an accurate record of the number of redeemable coupons actually issued, permitting a subsequent comparison of the number of coupons actually redeemed to the number of coupons actually issued.

Figure 3:
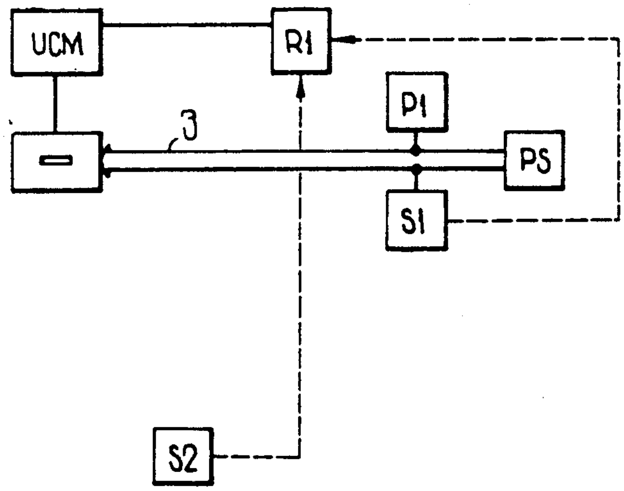
FIG. 3 ia a schematic diagram of a second preferred embodiment of the present invention.
Figure 7:
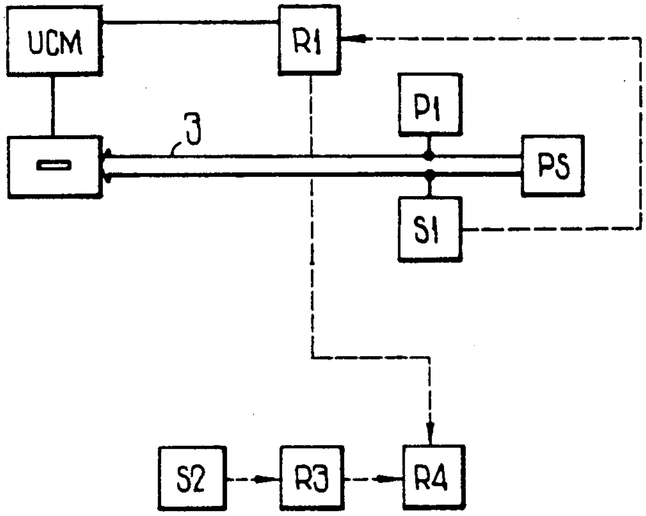
FIG. 7 is a schematic diagram of a sixth preferred embodiment of the present invention.
Figure 8:
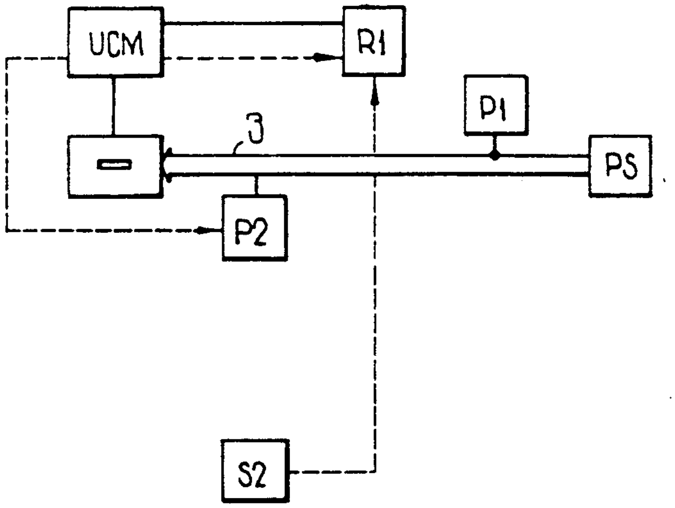
FIG. 8 is a schematic diagram of a seventh preferred embodiment of the present invention.

As shown in FIGS. 3 through 12, the present invention may include one or more wand bar code scanners 12 which are placed at remote locations for the purpose of recording information from the automated teller machine redeemable coupon receipts as they are redeemed. Ideally, such remote scanners 12 would be communicably attached, as by a modem and dedicated telephone line 13, to the recording device 9 located inside the automated teller machine 5, as shown in FIGS. 3 and 8. Alternatively, as seen in FIGS. 4, 5, 6, 7, 9, 10, 11 and 12, such remote scanners 12 may be communicably attached along a pathway 14 to an independent recording device 11.

As seen in FIG. 3, data received by the wand bar code scanner 12 is sent to the recording device 9 located inside the automated teller machine 5 along the communication pathway 13. Additionally, the information encoded in each dispensed, preprinted coupon is read by the internal bar code scanner 4 and is transmitted to the recording device 9 located inside the automated teller machine 5 by means of a communication pathway 8.

Figure 4:
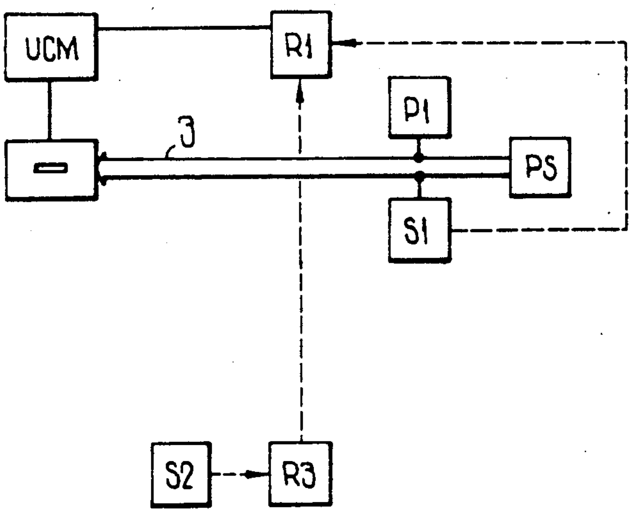
FIG. 4 is a schematic diagram of a third preferred embodiment of the present invention.

FIG. 4 is the same as FIG. 3 except that an independent recording device 11 has been inserted between the remote bar code scanner 12 and the internal recording device 9. Accordingly, in FIG. 4, the information picked up by the remote bar code scanner 12 is transferred by means of a communication pathway 14 to an independent recording device 11, which could, for instance, be located at an advertiser's business establishment. The independent recording device 11 then transmits the information to the internal recording device 9 along communication pathway 15. Notice that data from such independent recording means 11 may be preserved in any convenient form such as a machine-readable disk and such data may be entered into the internal recording device 9 from time to time at convenient intervals for consolidation and reconciliation of data.

Additionally, as depicted in FIGS. 5, 6 and 7, one or more independent recording devices 11 may be placed in a central location and may be used to consolidate data from multiple automated teller machines 5, remote wand bar code scanners 12 and other recording devices 11 or 9. FIG. 5 depicts the use of two independent recording devices 11*a* and 11*b*. In this particular model, information received from the remote bar code scanner 12 is transmitted along communication pathway 14 to a first independent recording device 11*a*. This first independent recording device 11*a* then relays the information to a second independent recording device 11*b* along communication pathway 16. Additionally, the internal bar code scanner 4 sends information to the second independent recording device 11*b* along pathway 10. The second independent recording device 11*b* then consolidates all the information it receives from pathway 10 and 16. You will notice that the additions of the various independent recording devices 11 afford different people and organizations, such as franchisers, district managers and the like, the opportunity to evaluate the success of a particular advertising campaign at various intervals.

FIG. 6 depicts a slight modification of FIG. 5 in that a third independent recording device 11*c* has been inserted between the internal bar code scanner 4 and the centrally located, independent recording device 11*b* in FIG. 6. Accordingly, information flows directly from the internal bar code scanner 4 to the third independent recording device 11*c* along information pathway 10. This same information is then transferred to the centrally located recording device 11*b* along pathway 17. The centrally located recording device 11*b* then consolidates this information with the data received from communication pathway 16.

FIG. 7 depicts a system in which information flows from the internal bar code scanner 4 to the internal recording device 9 along a communication pathway 8. This information is then transferred by means of an information pathway 18 to a centrally located recording device 11*b*. The centrally located recording device 11*b* then consolidates the information received from pathway 18 with that received from pathway 16.

Referring now to FIGS. 8 through 12, the present invention can be modified to include a second printer 19, which is added in a position to permit printing on the back of the continuous roll of automated teller machine receipt paper 1. In this embodiment, both sides of the continuous roll of automated teller machine receipt paper 1 are blank so that a customer's banking transaction may be printed by one printer 7, and a customer's coupon selection may be printed by the second printer 15 on the opposite side of the paper supply 1. The second printer 19 is capable of printing both bar code symbols and alpha numeric information and may be responsive to instructions given by an automated teller machine customer at the user communication means 5. These customer instructions are conveyed to the second printer 19 by means of a communication pathway 20. The automated teller machine's means for communicating with the customer would be programmed to give the customer an opportunity and means for selecting one or more of a group of coupons which the customer would like to have printed on the back of his automated teller machine receipt. Thus, a single vendor can compare which of a group of discounts would be the greatest motivator in attracting the customer to his establishment. Information gathered would be useful in providing reliable market research to be used in designing future promotions and in particular would result in better use of advertising space in printed publications where cost and space do not permit a vendor to provide a variety of coupons from which the customer can select.

In accordance with the preferred embodiments set forth in FIGS. 8 through 12, it will be possible to provide redeemable coupons from a variety of vendors so that each customer should be able to find at least one coupon for a vendor that he would like to patronize.

The structure of the embodiment depicted in FIG. 8 is the same as that found in FIG. 3, except that, a second printer 19 is used instead of an internal bar code scanner 4 and pre-printed coupons. Accordingly, the information pathway 8 between the bar code scanner 4 and the first recording means 9 is absent in FIG. 8. Additionally, in FIG. 8, the automatic teller machine 5 sends information both to the second printer 19 by means of a communication pathway 20 and to the internal recording device 9 which is located inside the automatic teller machine 5 through a communication pathway 21. Lastly, just as was the case in FIG. 3, information collected by the remote bar scanners 12 is transferred to the internal recording device 9 by means of communication pathway 13.

Figure 9:
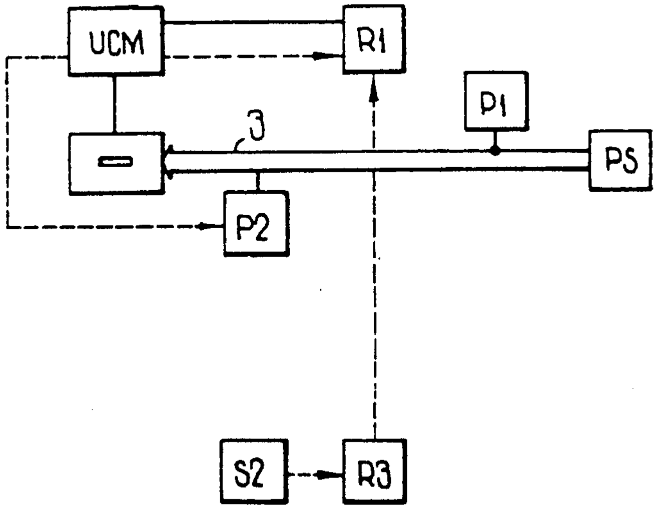
FIG. 9 is a schematic diagram of an eighth preferred embodiment of the present invention.

The overall structure and informational flow are the same in FIG. 9 as they were in FIG. 8 except that in FIG. 9, the direct information pathway 13 between the remote wand bar code scanner 12 and the internal recording device 9 has been interrupted by the addition of an independent recording device 11. In this manner, information flows from the remote wand bar code scanner 12 to the independent recording device 11 along a communication pathway 14 and then flows from the independent recording device 11 to the internal recording device 9 along pathway 15.

Figure 10:
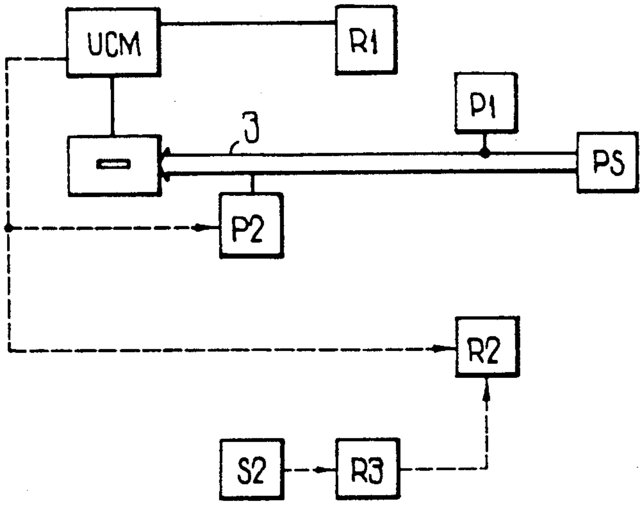
FIG. 10 is a schematic diagram of a ninth preferred embodiment of the present invention.

The only differences between FIGS. 9 and 10 are the addition of a second independent recording device 11*b* in FIG. 10 and a change in the communication pathways. In FIG. 10, information is again sent from the automatic teller machine 5 to the second printer 19 through the communication pathway 20. However, rather than having the automatic teller machine simultaneously send the same information to the internal recording means 9, the automatic teller machine sends such information to one of the independent recording devices 11*b* (which might, for instance, be located in a franchisor's home or office), along pathway 22. Additionally, information collected by the remote bar code scanner 12 is sent along pathway 14 to an independent recording device 11*a* which, in turn, sends it to a centrally located, independent recording device 11*b* along pathway 16. It is the second independent recording device 11b which collects and consolidates all of the information received by both communication pathways 16 and 22.

Figure 11:
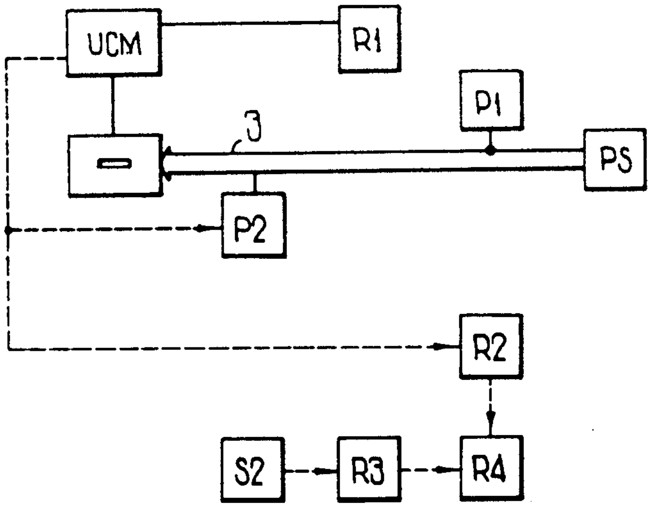
FIG. 11 is a schematic diagram of a tenth preferred embodiment of the present invention.

FIG. 11 slightly modifies the embodiment depicted in FIG. 10 by adding another independent recording device 11c (which might, for example, be located in a district manager's house). In this embodiment, the direct informational flow line between the automatic teller machine 5 and the information consolidation independent recording device 11b which was seen in FIG. 10 is interrupted by the addition of another independent recording device 11c. Accordingly, information flows along pathway 22 from the automated teller machine 5 to the independent recording device 11c and then is transferred along pathway 17 from one independent recording device 11c to another, centrally located, independent recording device 11b. The centrally located, independent recording device 11b has the capacity to consolidate data received from multiple automated teller machines 5, remote wand bar code scanners 12 and independent recording devices 11a and 11c.

Figure 12:
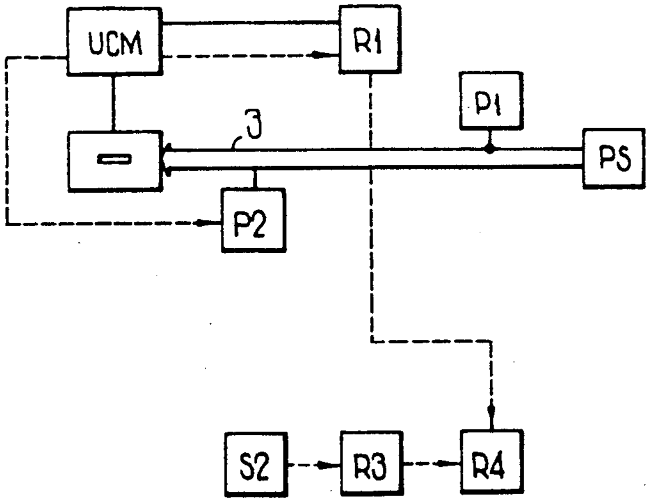
FIG. 12 is a schematic diagram of an eleventh preferred embodiment of the present invention.

Lastly, FIG. 12 depicts a system in which information flows simultaneously from the automated teller machine 5 to both the internal recording device 9 along communication pathway 21 and to the second printer 19 along communication pathway 20. The information received by the internal recording device 9 from the automated teller machine 5 is then transferred by means of an informational pathway 18 to a centrally located, independent recording device 11b. Additionally, information collected by the remote bar code scanners 12 is transferred over communication lines 14 to an independent recording device 11a which then transmits this information to the centrally located, independent recording device 11b over information pathway 16. The centrally located, independent recording device 11b then consolidates all of the information it receives from pathways 16 and 18.

From the foregoing description it will be seen that this invention provides an improved automated teller machine meeting the objectives set forth above. It will be understood, however, by those skilled in the art that this invention may be adapted to encompass other embodiments of the invention other than the preferred embodiments set forth above, that the embodiments of the invention described above are merely illustrative, and that the present invention is limited solely by the appended claims.

What I claim is:

1. A redeemable coupon disbursement control and record system comprising:

(a) An automated teller machine including a user communication means for communication between the automated teller machine user and the automated teller machine, a means for preparing a paper receipt, a means for conveying said receipt paper through said automated teller machine, and a first means for recording information;

(b) Scanning means along the path of conveyance of said receipt paper for reading information recorded on at least one surface cf said receipt paper; and (c) Means for relaying information from said scanning means to said first recording means.

2. A redeemable coupon disbursement control and record system as recited in claim 1 wherein said scanner is an optical scanner.

3. A redeemable coupon disbursement control and record system as recited in claim 2 wherein said optical scanner includes a laser scanner.

4. A redeemable coupon disbursement control and record system as recited in claim 1 wherein said first recording means is also communicably linked to said user communication means.

5. A redeemable coupon disbursement control and record system as recited in claim 1 further comprising one or more remotely located scanning means capable of receiving information from said receipt paper.

6. A redeemable coupon disbursement control and record system as recited in claim 5 wherein said remotely located scanning means are communicably linked to said first recording means.

7. A redeemable coupon disbursement control and record system as recited in claim 5 further comprising a second recording means communicably linked to said remotely located scanning means.

8. A redeemable coupon disbursement control and record system as recited in claim 7 further comprising a third recording means capable of receiving information from one or more of said first and second recording means and capable of compiling, comparing, analyzing and reconciling said information.

9. A redeemable coupon disbursement control and record system comprising:

(a) An automated teller machine including a user communication means for communication between the automated teller machine user and the automated teller machine, means for preparing a paper receipt, means for conveying said receipt paper through said automated teller machine, and a first means for recording information and a second means for recording information;

(b) Scanning means along the path of conveyance of said receipt paper for reading information recorded on at least one surface of said receipt paper; and (c) Means for relaying information from said scanning means to said second recording means.

10. A redeemable coupon disbursement control and record system as recited in claim 9 wherein said second recording means is also communicably linked to said user communication means.

11. A redeemable coupon disbursement control and record system as recited in claim 9 further comprising one or more remotely located scanning means capable of receiving information from said receipt paper.

12. A redeemable coupon disbursement control and record system as recited in claim 11 wherein said remotely located scanning means are communicably linked to said second recording means.

13. A redeemable coupon disbursement control and record system as recited in claim 11 further comprising a third recording means communicably linked to said remotely located scanning means.

14. A redeemable coupon disbursement control and record system as recited in claim 14 further comprising a fourth recording means capable of receiving information from one or more of said first, second and third recording means and capable of compiling, comparing, analyzing and reconciling said information.

15. A redeemable coupon disbursement control and record system as recited in claim 9 wherein said scanning means includes an optical scanner.

16. A redeemable coupon disbursement control and record system as recited in claim 15 wherein said optical scanner includes a laser scanner.

17. A redeemable coupon disbursement control and record system comprising:

(a) An automated teller machine including a user communication means for communication between the automated teller machine user and the automated teller machine, a means for preparing a paper receipt, means for conveying said receipt paper through said automated teller machine, and a first means for recording information; and (b) Printing means along the path of conveyance of said receipt paper for printing machine readable information on at least one surface of said receipt paper.

18. A redeemable coupon disbursement control and record system as recited in claim 17, further including means for relaying information associated with said printed information to said first recording means.

19. A redeemable coupon disbursement control and record system as recited in claim 17 wherein said first recording means is also communicably linked to said user communication means.

20. A redeemable coupon disbursement control and record system as recited in claim 17 further comprising one or more remotely located scanning means capable of receiving information from said receipt paper.

21. A redeemable coupon disbursement control and record system as recited in claim 20 wherein said remotely located scanning means are communicably linked to said first recording means.

22. A redeemable coupon disbursement control and record system as recited in claim 17, further including second recording means and further including means for relaying information associated with said printed information to said second recording means.

23. A redeemable coupon disbursement control and record system as recited in claim 22 wherein said second recording means is also communicably linked to said user communication means.

24. A redeemable coupon disbursement control and record system as recited in claim 22 further comprising one or more remotely located scanning means capable of receiving information from said receipt paper.

25. A redeemable coupon disbursement control and record system as recited in claim 24 wherein said remotely located scanning means are communicably linked to said second recording means.

26. A redeemable coupon disbursement control and record system as recited in claim 24 further comprising a third recording means communicably linked to said remotely located scanning means.

27. A redeemable coupon disbursement control and record system as recited in claim 26 further comprising a fourth recording means capable of receiving information from one or more of said first, second and third recording means and capable of compiling, comparing, analyzing and reconciling said information.

* * * * *